US010621883B2

(12) United States Patent
Chesi et al.

(10) Patent No.: US 10,621,883 B2
(45) Date of Patent: Apr. 14, 2020

(54) ANGULARLY UNBOUNDED THREE-AXIS SPACECRAFT SIMULATOR

(71) Applicants: The Regents of the University of California, Oakland, CA (US); United States of America as represented by the Secretary of the Navy, Office of Naval Research, Arlington, VA (US)

(72) Inventors: Simone Chesi, Glasgow (GB); Marcello Romano, Monterey, CA (US)

(73) Assignees: The Regents of the University of California, Oakland, CA (US); The United States Government as represented by the Secretary of the Navy, Office of Naval Research, Arlington, VA (US)

( * ) Notice: Subject to any disclaimer, the term of this patent is extended or adjusted under 35 U.S.C. 154(b) by 693 days.

(21) Appl. No.: 14/908,483

(22) PCT Filed: Jul. 28, 2014

(86) PCT No.: PCT/US2014/048415
§ 371 (c)(1),
(2) Date: Jan. 28, 2016

(87) PCT Pub. No.: WO2015/069329
PCT Pub. Date: May 14, 2015

(65) Prior Publication Data
US 2016/0163218 A1 Jun. 9, 2016

Related U.S. Application Data

(60) Provisional application No. 61/865,370, filed on Aug. 13, 2013.

(51) Int. Cl.
*G09B 9/52* (2006.01)
*B64G 7/00* (2006.01)

(52) U.S. Cl.
CPC ........ *G09B 9/52* (2013.01); *B64G 7/00* (2013.01)

(58) Field of Classification Search
CPC ..... G09B 9/00; G09B 9/02; G09B 9/12; G09B 9/52; B64G 1/00; B64G 1/14; B64G 1/16; B64G 1/105; B64G 7/00
See application file for complete search history.

(56) References Cited

U.S. PATENT DOCUMENTS 3,266,052 A 8/1966 Yamron
3,380,788 A * 4/1968 Wilcock ............... F16C 32/064
384/109

(Continued)

OTHER PUBLICATIONS

"Historical Review of Air-Bearing Spacecraft Simulators"; Journal of Guidance, Control and Dynamics; vol. 26, No. 4, Jul.-Aug. 2003; pp. 513-522.*

(Continued)

*Primary Examiner* — Bruk A Gebremichael
(74) *Attorney, Agent, or Firm* — Lumen Patent Firm

(57) ABSTRACT

A method of simulating 3-degrees of freedom spacecraft rotational dynamics is provided that includes attaching a payload, using a spherical air bearing, to an inner gimbal of a 3-axis gimbal, where the 3-axis gimbal includes an outer gimbal, a mid-gimbal and the inner gimbal, using a motion controller to control motion of each the gimbal of the 3-axis gimbal, where the motion controller includes an appropriately programmed computer and a motion control motor, sensing limits of free travel of the spherical air bearing, using a position sensor, and changing a position of the 3-axis gimbal away from the limit of free travel of the spherical air bearing when the spherical air bearing approaches the limit of free travel, wherein the position change effects travel of the spherical bearing to be unbounded by the limit of free travel, wherein $4\pi$ steradians spacecraft dynamics of the payload are simulated.

6 Claims, 5 Drawing Sheets

(56) References Cited

U.S. PATENT DOCUMENTS

| | | | | |
|---|---|---|---|---|
| 3,387,482 | A | * | 6/1968 | Wilcock .................. B64G 7/00 |
| | | | | 248/678 |
| 3,611,785 | A | * | 10/1971 | Hanson ............... F16C 32/0696 |
| | | | | 384/109 |
| 4,908,558 | A | | 3/1990 | Lordo |
| 5,261,819 | A | * | 11/1993 | Harvey .................... G09B 9/52 |
| | | | | 434/34 |
| 7,905,463 | B2 | | 3/2011 | Burnham |
| 2004/0173726 | A1 | | 9/2004 | Mercadal |
| 2013/0188895 | A1 | | 7/2013 | Devitt |

OTHER PUBLICATIONS

"A Three Degrees of Freedom Test Bed for Nanosatellite and Cubesat Attitude Dynamics, Determination, and Control"; Naval Postgraduate School; by David M. Meissner; Dec. 2009; total pp. 104.*

Acquisition, Tracking, and Pointing Technology Development for Bifocal Relay Mirror Spacecraft. Acquisition, Pointing, and Laser Systems Technology XXI, edited by Chodos et al. Proc. SPIE vol. 6569, 656907-1 to 656907-15, May 16, 2007.

* cited by examiner

ANGULARLY UNBOUNDED THREE-AXIS SPACECRAFT SIMULATOR

CROSS-REFERENCE TO RELATED APPLICATIONS

This application is a 371 of PCT Patent Application PCT/US2014/048415 filed Jul. 28, 2014, which claims the benefit of U.S. Application 61/865,370 filed Aug. 13, 2013.

FIELD OF THE INVENTION

The present invention relates generally to spacecraft three-axis simulators. More particularly, the invention relates to spacecraft three-axis simulators having no limitation on the maximum angle of rotation.

BACKGROUND OF THE INVENTION

The simulation of the satellite rotational dynamics on a three-degrees of freedom (DOF) spacecraft simulator has always been limited by the maximum angle of rotation allowed by the spherical air bearing. A number of different three-axis spacecraft simulators based on spherical air bearing have been developed so far, but none of them allows a full $4\pi$ steradians rotation.

This limitation of the spherical air bearing reduced the effectiveness of the experimental validation of spacecraft rotational dynamics, for instance, large angle maneuvers or detumbling cannot be fully tested on standard spacecraft simulator.

What is needed is a method of eliminating the constraint on the maximum rotation angle, whereby a complete ground testing of the spacecraft attitude determination and control techniques will be possible.

SUMMARY OF THE INVENTION

To address the needs in the art, a method of simulating 3-degrees of freedom spacecraft rotational dynamics is provided that includes attaching a payload, using a spherical air bearing, to an inner gimbal of a 3-axis gimbal, where the 3-axis gimbal includes an outer gimbal, a mid-gimbal and the inner gimbal, using a motion controller to control motion of each gimbal of the 3-axis gimbal, where the motion controller includes an appropriately programmed computer operating a motion control motor, sensing limits of free travel of the spherical air bearing, using a position sensor, and changing a position of the 3-axis gimbal away from the limit of free travel of the spherical air bearing when the spherical air bearing approaches the limit of free travel, wherein the position change effects travel of the spherical bearing to be unbounded by the limit of free travel, wherein $4\pi$ steradians spacecraft dynamics of the payload are simulated.

According to one aspect of the invention, the position sensor can be a 2D laser sensor, ultrasound sensors, infrared sensors, encoders, 3-axis accelerometer, 3-axis gyroscope, or vision metrology systems.

In another aspect of the invention, the gimbal motion control motor can include rotary stepper motors, rotary servo motors, pneumatic rotary motors, or rotary AC/DC motors.

In a further aspect of the invention, the spherical bearing includes a single vacuum preloaded spherical air bearing or a pair of opposing the spherical air bearings.

In yet another aspect, the invention further includes translating the 3-axis gimbal along a horizontal plane of the outer gimbal of the 3-axis gimbal, where the horizontal plane is parallel to a base of the outer gimbal of the 3-axis gimbal.

DETAILED DESCRIPTION

The current invention provides a spacecraft three-axis simulator, where there is no limitation on the maximum angle of rotation (angularly unbounded). According to one embodiment, the system allows a spherical air bearing to rotate freely in $4\pi$ steradians and consequently it generates a spherical frictionless shell without angular boundaries. The applications of the current invention include full experimental ground testing of spacecraft rotational dynamics, without angular limitations, missile attitude control systems, agile spacecraft attitude control, spacecraft jitter and fluid damping.

According to one embodiment of the invention, a spacecraft three-axis simulator is provided that includes a system that allows ground simulation of frictionless and microgravity space environment. This angularly unbounded spacecraft simulator allows full ground testing of spacecraft rotational dynamics. The main component of the angularly unbounded spacecraft simulator is composed by a structure that allows a spherical air bearing to rotate freely in $4\pi$ steradians and consequently to generate a spherical frictionless shell that does not have restrictions on the maximum rotation angle. According to one embodiment, a spacecraft (or any generic payload) can be placed inside this spherical frictionless shell, and as a result the spacecraft is able to rotate freely in all directions without angular limitations.

Two main advantages are provided by the spacecraft simulator according to the current invention: 1) For the first time it is possible to simulate completely the spacecraft (or a generic payload) rotational dynamics so that the attitude determination and control techniques can be fully experimentally verified. 2) This test-bed can be used for various validations including, but not limited to: missiles attitude dynamics, agile spacecraft attitude control, jitter damping in exile structure and fluid damping.

Figure 1:
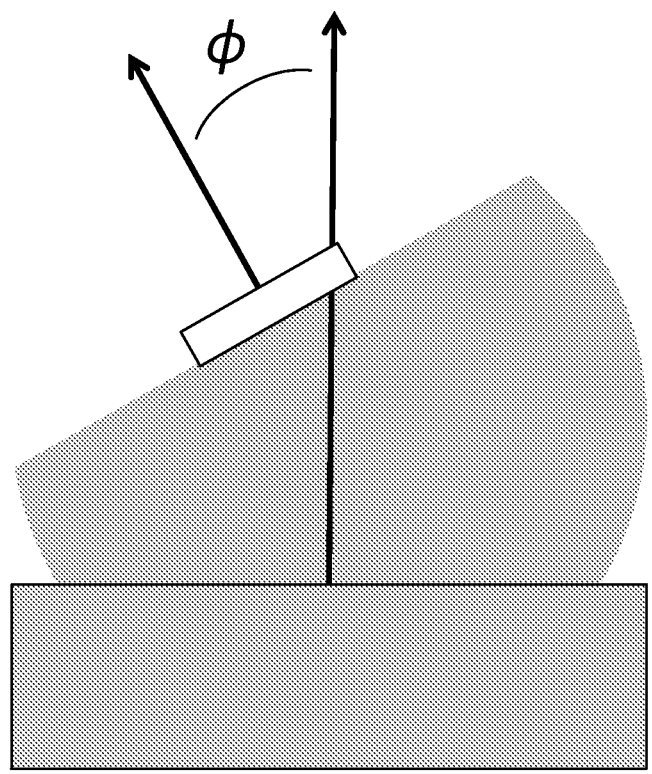
FIG. 1 shows a schematic drawing of a prior art stall angle of a three-axis simulator, where the maximum stall angle for a spacecraft simulator is $\theta=55$ degrees.

According to the current invention, the spacecraft simulator allows full three-degrees of freedom simulation by using spherical air bearings and an external gimbal structure. By using a spherical air bearing alone, there is always limitation in the maximum angular rotation. This limitation happens when the stall angle between the normal to the plane of the hemisphere floating over the air bearing, and the normal to the spherical air bearing horizontal plane is greater than the stall angle $\phi$. An example of this condition is shown in FIG. 1, where the schematic drawing shows a maximum stall angle for a prior art spacecraft simulator is $\phi=55$ degrees. The stall angle is always present in spherical air bearing based simulator. The value of the stall angle depends on the simulator design. This value can be change but usually is in the range of $0 \leq \phi \leq 50$ degrees.

This problem cannot be overcome during the rotational motion but can be avoided using an external structure that is never in contact with the spacecraft, according to the current invention. According to one embodiment of the current invention, the external structure prevents $\phi$ from being grater than the maximum stall angle by rotating the spherical air bearing horizontal axis in a way such that the normal to the spherical air bearing horizontal plane is always aligned with the normal to the hemisphere plane. In this way it is possible to generate a virtually spherical frictionless shell while the spacecraft (or any payload) slides inside it.

According to one embodiment of the invention, the spacecraft simulator is made using two spherical air bearing. In another embodiment the spacecraft simulator is made using only one vacuum preloaded spherical air bearing.

Considering now a sphere having a central region removed, where two spherical cups remain. Here, the two spherical cups represent the spherical air bearings. A support structure replaces the removed region between the two spherical cups so that the center of rotation of these two cups remains the same. For example, the support structure has a length equal to the distance between the two spherical cups, and is inserted between the two spherical cups, where the support structure hosts the spacecraft hardware sensor and actuator, according to one embodiment. It is understood that the current embodiment can be adapted to accommodate different payload configurations.

Figure 2:
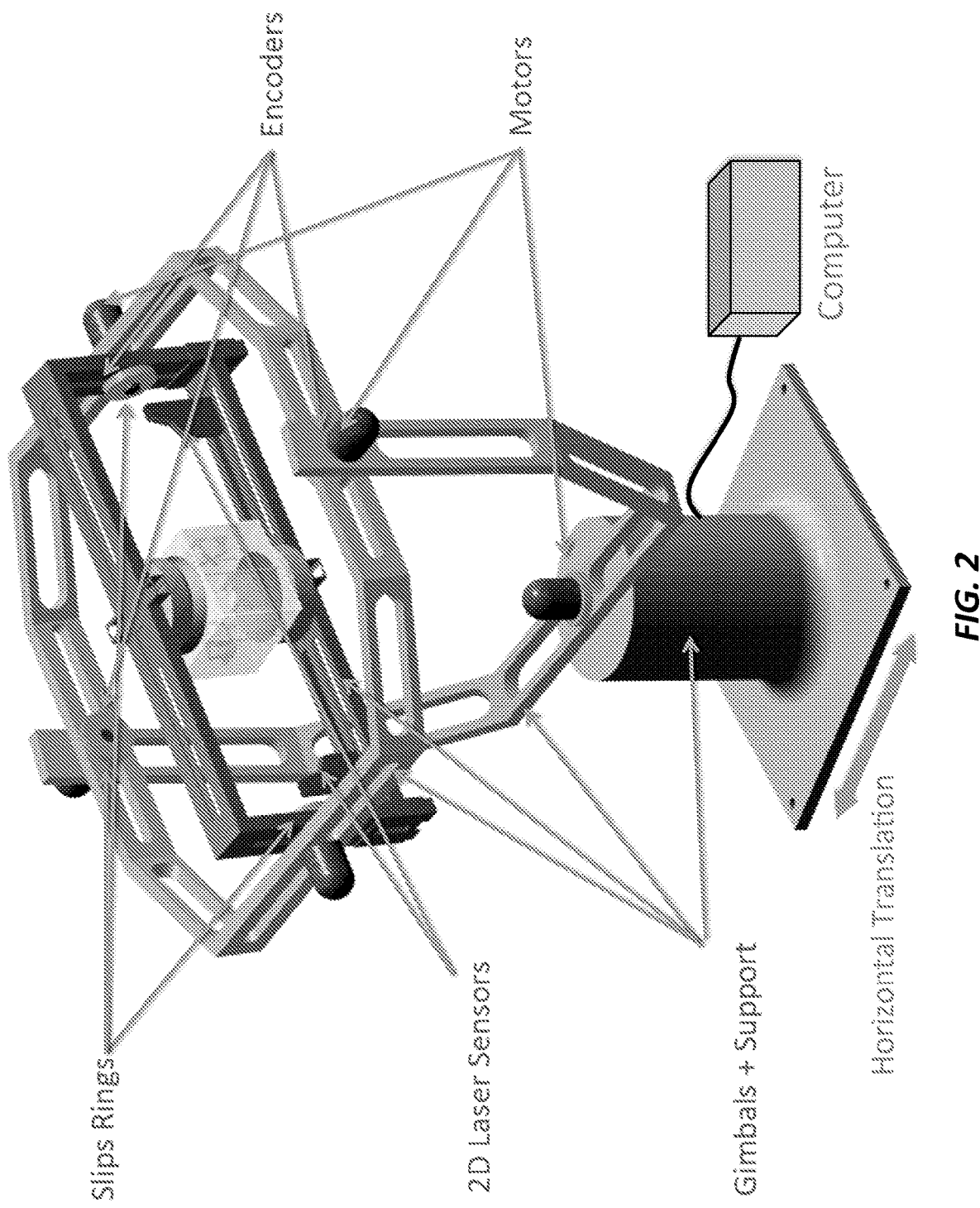
FIGS. 2-3 show a spacecraft simulator having a double spherical air bearing, according to one embodiment of the invention.
Figure 3:
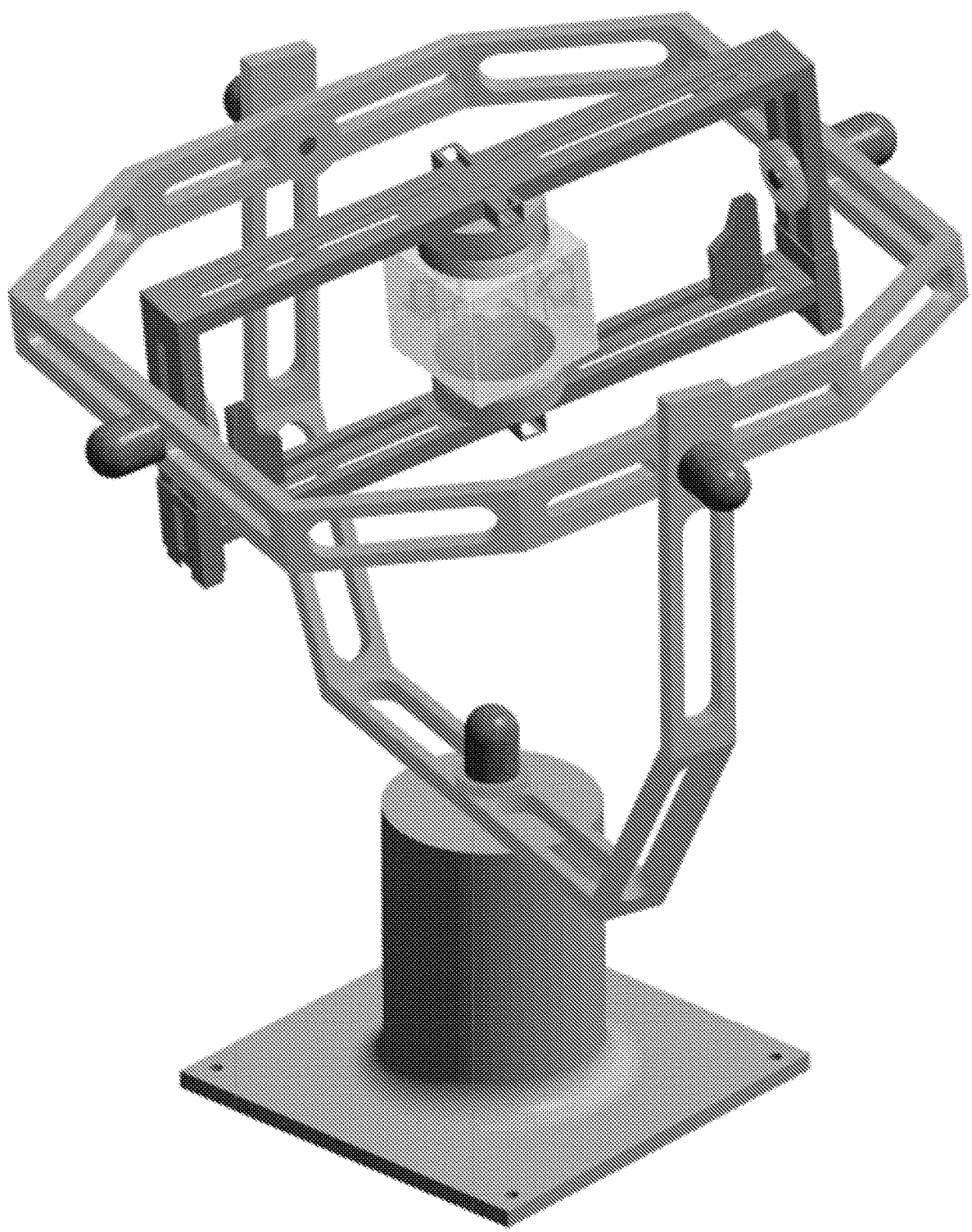

According to one embodiment of the current invention, as shown in FIGS. 2-3, the two spherical air bearings are configured such that the center of rotation of all the elements is the same, where they are constrained using and external gimbal so that a spherical joint is formed. Here, the spacecraft simulator can rotate 360 degrees around the yaw axis, yet only ≈10-15 degrees around the pitch and roll axis. The maximum angle of rotations along these two axes is the angle between the spherical cups plane and the air bearings normal to the horizontal plane in the local frame and not with respect to the inertial frame.

The current invention simulates a generic rotational motion, where in all directions the angle $\phi$ remains below the stall angle, the rotational motion in all directions can be simulated. To meet this condition, two additional gimbals are adapted to the external structure so that the total number of degrees of freedom of the external gimbal structure is three. Further, according to one embodiment, an external support structure is provided to sustain the external structure.

During the rotational motion the external structure aligns the normal of the hemisphere plane that is floating over the air bearing to the normal of the horizontal plane of the spherical air bearing so that the spacecraft will continuously slide inside a spherical frictionless shell.

According to one embodiment of the invention, the inertia matrix that affects the system rotational motion is decoupled from the external gimbals, where the physical characteristics of the payload inside the inner gimbal are unchanged to enable simulation the body rotational dynamics with high fidelity. Each of the three gimbals rotate autonomously using a rotational motor, where the gimbal motion control motor can include rotary stepper motors, rotary servo motors, pneumatic rotary motors, or rotary AC/DC motors. In one embodiment, a slip ring is used in the joint to transmit a signal from one gimbal to the other. In one embodiment, the invention further includes translating the 3-axis gimbal along a horizontal plane of the outer gimbal of the 3-axis gimbal, where the horizontal plane is parallel to a base of the outer gimbal of the 3-axis gimbal.

Figure 4:
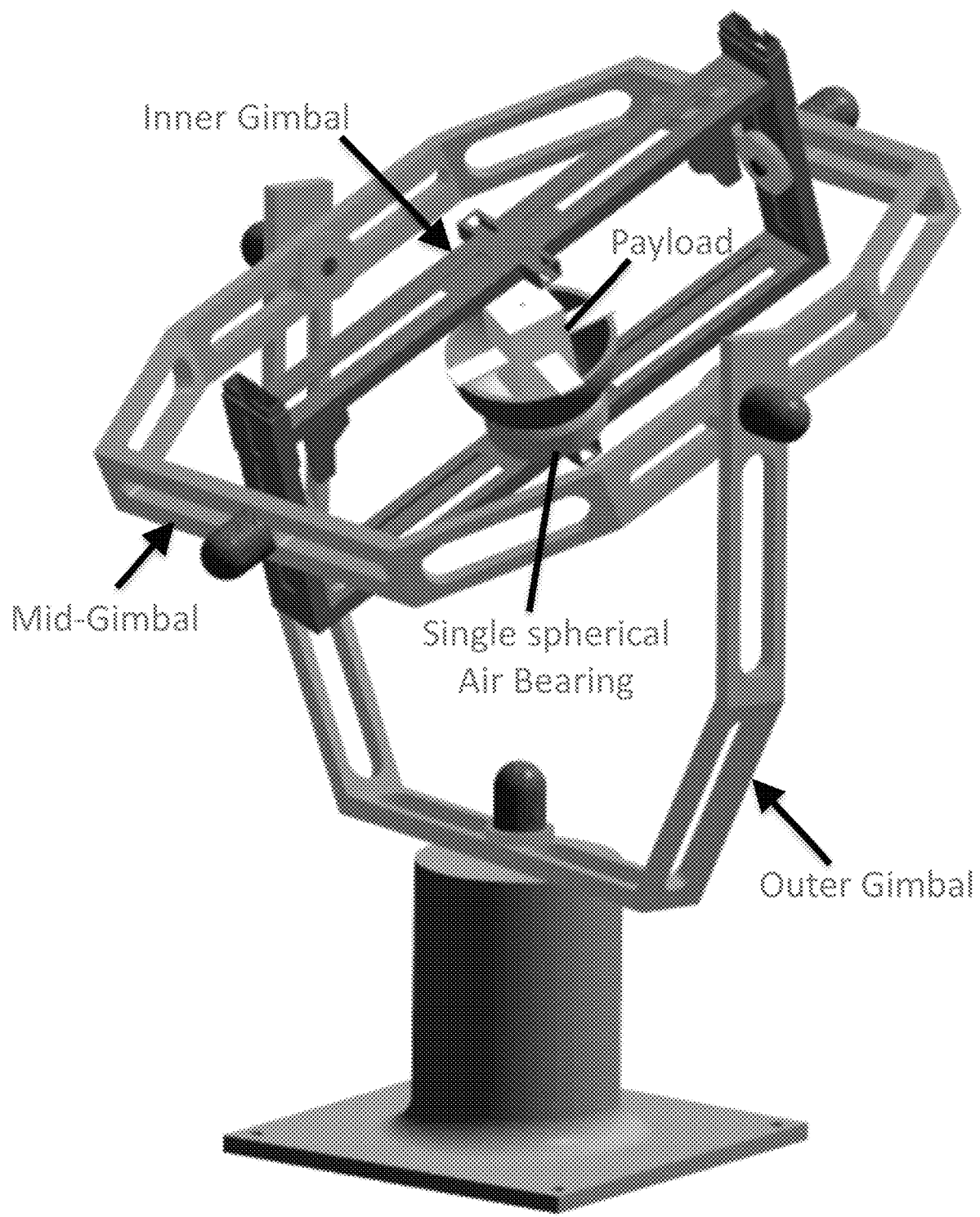
FIG. 4 shows a spacecraft simulator having a single spherical air bearing, according to one embodiment of the invention.

In another embodiment of the current invention, as shown in FIG. 4, a single vacuum preloaded spherical air bearing is used that is able to generate a radial load while keeping the spherical cup attached to the air bearing to provide a torque free system. In the internal area of the spherical air bearing there is vacuum chamber that is capable of holding the spherical air bearing in any orientation without exerting any external torque. By using this spherical air bearing the second cup on the opposite side of the system is unnecessary.

According to the invention, each gimbal rotates along its own axis using a motor. In one embodiment, the stepper motors are equipped with an encoder so that the rotation of one gimbal with respect to another can be determined with high accuracy. In a further embodiment, on the opposite side of the motor a two-way hydraulic rotary joint equipped with electrical slip-rings allow a vacuum line and a pressure line to reach the spherical air bearing. The electrical lines are used to supply power to the stepper motors and read data from and encoder and a laser displacement sensor. In one embodiment, displacement (or position) sensors are mounted on the first gimbal and are used in combination with the encoder to measure with high accuracy the attitude of the payload, where the position sensor can be a 2D laser sensor, ultrasound sensors, infrared sensors, encoders, 3-axis accelerometer, 3-axis gyroscope, or vision metrology systems. This information can be used to calculate with extreme precision the payload attitude with respect to the inertial frame.

Figure 5:
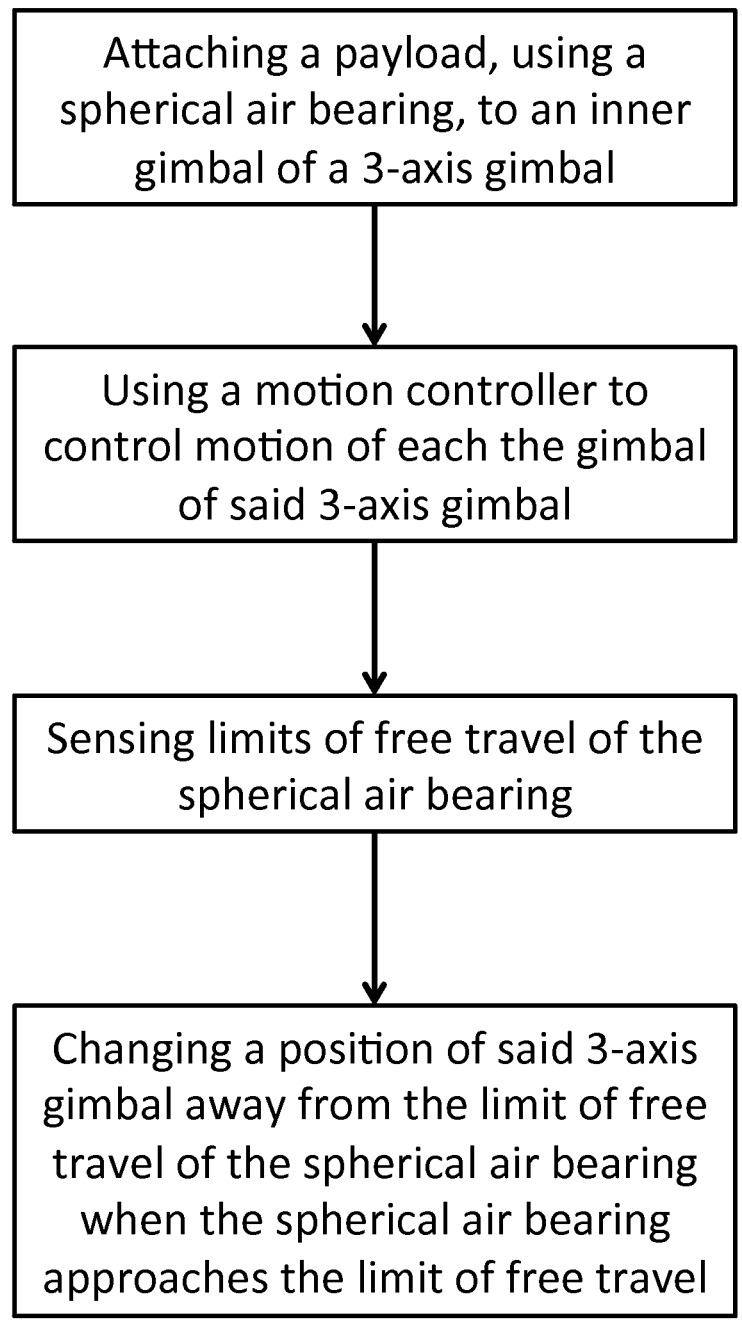
FIG. 5 shows a flow diagram of the method of simulating 3-degrees of freedom spacecraft rotational dynamics, according to one embodiment of the invention.

FIG. 5 shows a flow diagram of the method of simulating 3-degrees of freedom spacecraft rotational dynamics, according to one embodiment of the invention. Here, simulating 3-degrees of freedom spacecraft rotational dynamics is provided that includes attaching a payload, using a spherical air bearing, to an inner gimbal of a 3-axis gimbal, where the 3-axis gimbal includes an outer gimbal, a mid-gimbal and the inner gimbal, using a motion controller to control motion of each the gimbal of the 3-axis gimbal, where the motion controller includes an appropriately programmed computer and a motion control motor, sensing limits of free travel of the spherical air bearing, using a position sensor, and changing a position of the 3-axis gimbal away from the limit of free travel of the spherical air bearing when the spherical air bearing approaches the limit of free travel, wherein the position change effects travel of the spherical bearing to be unbounded by the limit of free travel, wherein $4\pi$ steradians spacecraft dynamics of the payload are simulated.

The current invention has many advantages that include providing a complete simulation of the spacecraft rotational dynamics, enabling investigation of different attitude control techniques for nonlinear maneuvers, detumbling, spin and three-axis stabilization, low cost, high accuracy attitude determination/validation ground systems, and experimental validation of attitude determination and control algorithms.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. All such variations are considered to be within the scope and spirit of the present invention as defined by the following claims and their legal equivalents.

What is claimed:

1. A method of simulating 3-degrees of freedom spacecraft rotational dynamics, comprising:
   a. attaching a payload, using a spherical air bearing, to an inner gimbal of a 3-axis gimbal, wherein said 3-axis gimbal comprises an outer gimbal, a mid-gimbal and said inner gimbal, wherein said outer gimbal is rotatably coupled, using a rotating motor, to a support element;
   b. using a motion controller to control motion of each said gimbal of said 3-axis gimbal, wherein said motion controller comprises a computer with a non-transitory computer medium configured to operate said motion control motor;
   c. sensing limits of free travel of said spherical air bearing, using a position sensor mounted on said inner gimbal, wherein said position sensor and said motion controller are configured to change a position of said 3-axis gimbal away from said limit of free travel of said spherical air bearing when said spherical air bearing approaches a limit of free travel, wherein said position change effects travel of said spherical air bearing to be unbounded by the limit of free travel; and
   d. changing a position of said 3-axis gimbal away from said limit of free travel of said spherical air bearing when said spherical air bearing approaches said limit of free travel, wherein angularly unbounded rotational spacecraft dynamics of said payload are simulated.

2. The method of simulating rotational spaceflight of claim 1, wherein said position sensor is selected from the group consisting of a 2D laser sensor, ultrasound sensors, infrared sensors, encoders, 3-axis accelerometer, 3-axis gyroscope, and vision metrology systems.

3. The method of simulating rotational spaceflight of claim 1, wherein said gimbal motion control motor is selected from the group consisting of rotary stepper motors, rotary servo motors, pneumatic rotary motors, and rotary AC/DC motors.

4. The method of simulating rotational spaceflight of claim 1, wherein said spherical air bearing comprises a single vacuum preloaded spherical air bearing.

5. The method of simulating rotational spaceflight of claim 1 further comprises translating said 3-axis gimbal along a horizontal plane of said outer gimbal of said 3-axis gimbal, wherein said horizontal plane is parallel to a base of said outer gimbal of said 3-axis gimbal.

6. The method of simulating rotational spaceflight of claim 1, wherein said spherical air bearing comprises a pair of opposing spherical air bearings.

* * * * *